April 13, 1926.

A. MacALLISTER 1,580,790

KNIFE OR INSTRUMENT FOR KILLING POULTRY

Filed May 4, 1925

Alexander MacAllister
INVENTOR.

BY *[signature]*
ATTORNEY.

Patented Apr. 13, 1926.

1,580,790

UNITED STATES PATENT OFFICE.

ALEXANDER MacALLISTER, OF BROWNSBURG, QUEBEC, CANADA.

KNIFE OR INSTRUMENT FOR KILLING POULTRY.

Application filed May 4, 1925. Serial No. 27,770.

*To all whom it may concern:*

Be it known that I, ALEXANDER MAC-ALLISTER, a citizen of Dominion of Canada, and resident of Brownsburg, in the county of Argenteuil and Province of Quebec, Dominion of Canada, have invented certain new and useful Improvements in Knives or Instruments for Killing Poultry, of which the following is a specification.

This invention appertains generally to knives or instruments for killing fowl and comprehends the provision of a simple, compact, durable and sanitary instrument of this character embodying a brain lobe piercer and jugular vein incision knife associated in proper relation for scientific killing.

Much of the poultry exposed for sale on the markets especially in the smaller centres, is unsightly as well as poor in quality, The best fatted bird is easily spoiled by improper killing. Torn skin and bruises partially account for poor condition, but the responsibility for most of it lies with the incomplete removal of blood. The clear bright color of flesh which the consumer demands, and which every poultry dresser endeavours to obtain, is secured only when the bird is properly "stuck" and "bled."

The operation of sticking or piercing the brain to kill spares the bird the torture of slowly bleeding to death. A thrust of the knife to the brain instantly renders the bird unconscious and insensible to pain. The method is humane, it is also to a great advantage to the picker, for when properly done, the muscles are paralyzed and the feathers pull easily.

*"Sticking to kill."*

There are three lobes of brain in a bird's skull. In one, the smallest and farthest back of these, centre the nerves, which control the feather muscles. This lobe lies at the very base of the skull, just above the U-shaped depression, which admits the spinal column. A knife in reaching this portion of the brain passes through the cleft in the roof of the mouth and pierces the soft bone at its extremity. In this position, the instrument lies midway between the eyes and parallel to the upper neck. A common mistake made by the inexperienced in their first attempts to "stick to kill" is starting the knife too far forward causing it to hit the middle instead of the rear lobe of the brain.

*"Cutting to bleed."*

There are two large blood vessels or jugular veins which run the entire length of the chicken's neck, one on either side, while just behind the ears and near to the base of the skull, there is a cross vein which connects the two larger veins referred to. From Fig. 1 of the drawings, it will be seen that this smaller vein does not run straight across, but that the junction on the left side is nearer the ear than is that on the right side. This fact is made use of in making the "incision to bleed" for one cut through that junction point, which is nearer the ear—that is, the one on the left side—causes a copious flow of blood and draws both veins.

The exact location of the cut is back of the ear, a little to the left of the median line as the head is held upside down in the hand, and very close to the base of the skull. A severe cut, or one too far back, mangles the tissue and allows the blood to clot and form a discolored area in the neck near the head, instead of causing the blood to run freely from the mouth.

Cognizant of the above, it is quite obvious that great care must be exercised in "sticking to kill" and "cutting to bleed" if the operation is to be properly performed.

With the above in view, my invention has for its object the provision of a simple, compact and durable killing knife or instrument, having a brain lobe piercer and a jugular vein incision knife, mounted upon a handle having a longitudinal beak guiding groove in the upper edge thereof in alignment with said brain lobe piercer, so that the instrument may be effectively used, even by a novice in killing, in that when the instrument is thrust into the bird's mouth, the beak of the bird sliding in said groove will serve to guide the instrument properly.

The invention is further characterized in that by the use of the same, the "sticking to kill" and "cutting to bleed" operations may not only be effected simultaneously, but the incision of the jugular vein at the proper junction as heretofore set forth, may be made without unnecessarily lacerating or mangling the tissue and causing the blood to clot and form a discolored area in the neck near the head.

A further object of the invention is to provide in a killing knife, a brain lobe piercer and a jugular vein incision knife, the said jugular vein incision knife being laterally offset with respect to said brain lobe piercer, so that when the instrument is thrust into the mouth of the bird, the jugular vein incision knife will be properly guided to sever the jugular veins at the junction of the same and the smaller cross vein heretofore referred to.

Another object of the invention is to provide in a knife of the character set forth, a hinged jugular vein incision knife retained by a spring in closed position, and free to recede from said brain lobe piercer aforesaid, when the same strikes the bone of the bird's skull thereby obviating unnecessary dulling and impairment of the jugular vein incision knife.

In connection with the foregoing, the invention is further characterized in that the jugular vein incision knife may be swung back from the brain lobe piercer sufficiently to enable proper cleansing and sharpening of the brain lobe piercer and the jugular vein incision knife.

A further object of the invention is to provide an instrument of the character set forth, which may be formed principally of stamped parts, so that the same may be produced at a very low cost.

With the foregoing and other objects in view which will appear more fully as the description proceeds, the invention resides in the novel combination and arrangement of elements hereinafter more specifically set forth, claimed and shown in the accompanying drawings forming a part of the present application, and in which:

Fig. 1 is a a plan view illustrating the upper portion of a fowl's mouth, the same appearing as if the lower portion of the beak were removed, illustrating the relation of the cleft in the roof of the mouth, the jugular veins, and the small cross vein referred to.

Like numerals of reference designate corresponding parts throughout the views.

Figure 4:
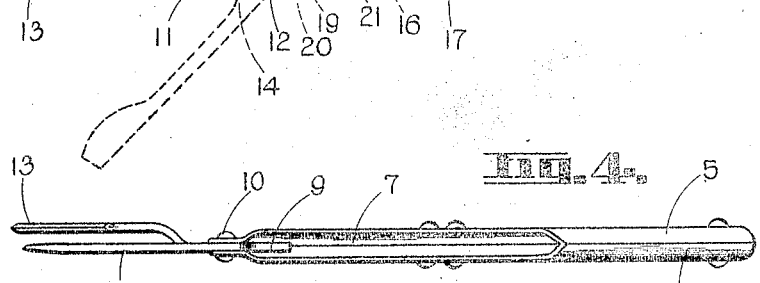
Fig. 4 is a top view thereof.

My invention comprises a handle formed of two sections 5 and 6, preferably stamped, each of which is formed with a channel along part of its upper edge, so that when the sections are assembled, a beak guide 7, best shown in Fig. 4, is provided. 8 designates the brain lobe piercer provided with the offset extension 9, which is secured between the sections of said handle by the rivets 10.

Figure 3:
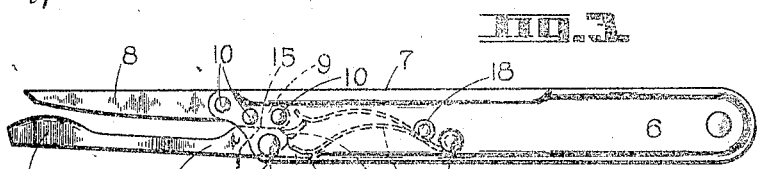
Fig. 3 is a side elevation of the instrument.

The jugular vein incision knife includes a shoulder 11 which is hinged between the sections of said handle on the pintle 12 which extends therethrough. The cutting blade or portion 13 is laterally offset as clearly shown in Fig. 4, with respect to said shoulder 11 and brain lobe piercer 8. A flat abutting edge 14 is formed on the shoulder 11, so that the same will abut the flat lower edge 15 of the extension 9 when the jugular vein incision knife is closed or is in the position shown in Fig. 3 in full lines. It is held in this position by means of the flat spring 16 which is connected by means of a looped end to the rivet 17 which extends through said handle. A rivet 18 also extending through said handle, serves to retain said spring flexed, so that the arcuate extremity 19 thereof, will at all times be tensioned against the like shaped extension 20 on the shoulder 11. The shoulder 11 is also provided with an inclined face 21 which abuts the face 18 of the extension 9 on the brain lobe piercer for the purpose of limiting the downward movement of said jugular vein incision knife beyond the position shown by dotted lines in Fig. 3.

From the foregoing, it is obvious that the jugular vein incision knife is yieldingly constrained in close proximity to the brain lobe piercer 8 by means of a flat spring 16, yet may recede therefrom, should said jugular vein incision knife strike the bone of the fowl's skull when killing the large fowl such as capons and turkeys, without dulling or impairing the same. Furthermore, when in extended position, the brain lobe piercer and jugular vein incision knife are in such position that they may be cleansed and sharpened without interfering one with the other.

Figure 1:
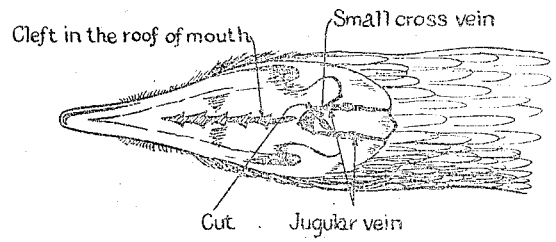
Figure 2:
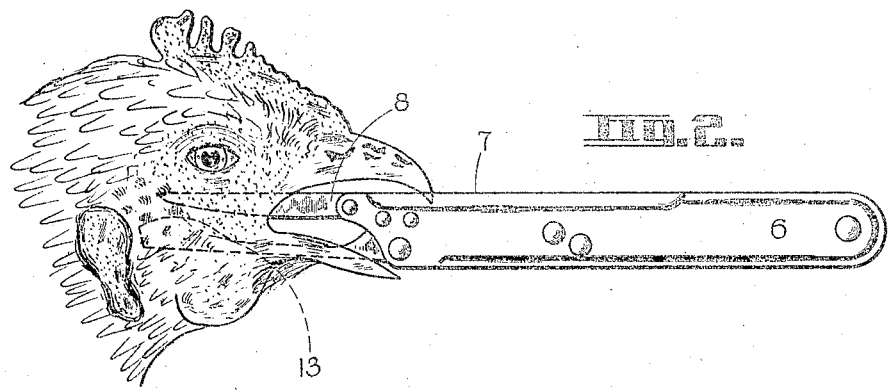
Fig. 2 is an elevation illustrating the head of a fowl and the position in which the instrument constituting my present invention is thrust into the mouth of the fowl for killing purposes.

The fowl to be killed is hung up by the feet, so that its head depends to about the operator's waist. The head is then gripped with the left hand and the beak is pressed slightly at the sides, so that the fowl will open the same. The upper portion of the beak is then placed in the groove 7 as clearly shown in Fig. 2 and the instrument held parallel with the upper neck portion of the bird, the point of the brain lobe piercer lying in the back of the cleft, in the roof of the mouth of the bird. A straight inward thrust will cause the brain lobe piercer to pass through the soft bone-like structure of the bird's skull and penetrate the rear brain lobe in which the nerves controlling the muscles are located. When this is properly done, the fowl will squawk. The jugular vein incision knife will pass over the bone of the skull at the back of the throat and drop onto the jugular veins at the junction of the same and the small cross vein, making a cut therethrough as indicated in Fig. 1. This cut will be sufficiently large to permit a copious flow of blood from both jugular veins but will not lacerate or mangle the tissue to such an extent as to cause clotting of blood and formation of a discoloured area in the neck of the bird.

From the foregoing, it is obvious that by virtue of the groove 7 at the top edge of the instrument in alignment with the brain lobe piercer 8 and the jugular vein incision knife in lateral offset position as illustrated and described, one inexperienced in killing poultry may accomplish the same with efficiency equal to the skilled killer, as it is merely necessary to place the portion of the beak in the groove 7 and thrust the instrument into the mouth parallel therewith, as described.

The instrument, due to its simplicity, may be manufactured at a very moderate cost, and the absence of cumbersome handles and bird holding means renders it very easy to clean, sterilize and sharpen.

What I claim as new is:

1. An instrument of the character set forth including a handle, a longitudinal beak guiding groove in the upper edge of said handle; a brain lobe piercer extending from said handle in alignment with said beak guiding groove; and a jugular vein incision knife extending from said handle beneath said brain lobe piercer.

2. An instrument of the character set forth including a handle, a longitudinal beak guiding groove in the upper edge of said handle; a brain lobe piercer extending from said handle in alignment with said beak guiding groove; and a jugular vein incision knife, extending from said brain lobe piercer, the cutting extremity of which is laterally offset with respect to said brain lobe piercer.

3. An instrument of the character set forth including a handle, a longitudinal beak guiding groove in the upper edge of said handle; a brain lobe piercer extending from said handle in alignment with said beak guiding groove; and a jugular vein incision knife, hinged to said handle extending therefrom beneath said brain lobe piercer, adapted to be hinged back with respect to said brain lobe piercer for cleansing and sharpening purposes.

4. An instrument of the character set forth including a handle, a longitudinal beak guiding groove in the upper edge of said handle; a brain lobe piercer extending from said handle in alignment with said beak guiding groove; and a jugular vein incision knife, hinged to said handle and extending therefrom beneath said brain lobe piercer, the cutting extremity of which is laterally offset with respect to said brain lobe piercer.

5. An instrument of the character set forth including a handle, a longitudinal beak guiding groove in the upper edge of said handle; a brain lobe piercer extending from said handle in alignment with said beak guiding groove; and a jugular vain incision knife hinged to said handle and extended therefrom beneath said brain lobe piercer, adapted to recede from said brain lobe piercer when the same strikes the bone of the bird's skull at the back of the throat; and a spring in said handle for tensioning said jugular vein incision knife towards said brain lobe piercer when said jugular vein incision knife is in closed relation.

6. An instrument of the character set forth including a handle, a brain lobe piercer extending from said handle; and a jugular vein incision knife, hinged to said handle and extending therefrom beneath said brain lobe piercer.

7. An instrument of the character set forth including a handle, a brain lobe piercer extending from said handle; and a jugular vein incision knife, hinged to said handle and extending therefrom beneath said brain lobe piercer, the cutting extremity of which is laterally offset with respect to said brain lobe piercer.

8. An instrument of the character set forth including a handle, a brain lobe piercer extending from said handle; and a jugular vein incision knife hinged to said handle and extending therefrom beneath said brain lobe piercer, adapted to recede from said brain lobe piercer when the same strikes the bone of the bird's skull at the back of the throat; and a spring for tensioning said jugular vein incision knife towards said brain lobe piercer.

9. An instrument of the character set forth including a handle formed of two stamped sections, each having a channel portion along part of the upper edge thereof, so that when the sections are assembled, said channels will provide a beak guiding groove.

10. An instrument of the character set forth including a handle, a longitudinal beak guiding groove in the upper edge of said handle; and a brain lobe piercer extending from said handle in alignment with said beak guiding groove.

11. An instrument of the character set forth including a handle, a brain lobe piercer extending from one end of said handle substantially in alignment therewith, and a jugular vein incision knife extending from said handle beneath said brain lobe piercer in spaced relation.

12. An instrument of the character set forth including a handle; means for guiding the upper section of the beak of a fowl along the top of said handle; a brain lobe piercer extending from said handle substantially in alignment with the top thereof; and a jugular vein incision knife extending from said handle beneath said brain lobe piercer in spaced relation.

In testimony whereof, I affix my signature.

ALEXANDER MacALLISTER.